United States Patent [19]

Signaigo

[11] Patent Number: 5,798,901
[45] Date of Patent: Aug. 25, 1998

[54] INTERRUPT SYSTEM

[75] Inventor: Robert C. Signaigo, Lemont, Ill.

[73] Assignee: Rockwell International Corporation, Costa Mesa, Calif.

[21] Appl. No.: 854,865

[22] Filed: May 12, 1997

Related U.S. Application Data

[63] Continuation of Ser. No. 517,936, Aug. 22, 1995, abandoned.

[51] Int. Cl.⁶ .................................................. H02H 3/00
[52] U.S. Cl. .................................................. 361/64; 307/38
[58] Field of Search ............................ 361/62–66, 115, 361/171, 191; 307/31, 38, 126, 132 E, 140; 340/825.71, 825.77, 825.06, 825.07, 825.08, 310.06, 644; 395/284, 285, 289–292, 297, 304, 828, 865, 727, 733, 736

[56] References Cited

U.S. PATENT DOCUMENTS 4,918,566  4/1990  Brodsky et al. .................. 361/191
5,293,589  3/1994  Skordov et al. .................. 395/284
5,455,760  10/1995  Bilas et al. ........................ 364/140

*Primary Examiner*—Ronald W. Leja
*Attorney, Agent, or Firm*—Welsh & Katz, Ltd.

[57] ABSTRACT

An interrupt system (10) having a plurality of electrical devices (12) having a time frame in which to examine an interrupt acknowledgement cycle, first and second lines (14 and 16) electrically connected to each of the electrical devices (12), a device (18) for issuing an interrupt signal on the first line (14), with said devices (12) determining during its time frame whether the cycle is intended for itself, and selected electrical devices (12) asserting a common acknowledgement signal on the second line (16) indicating the cycle is being serviced, such that removal of any electrical device (12) does not compromise the system interrupt capability.

4 Claims, 2 Drawing Sheets

All Devices Present
(Normal Operation)

All Devices Present
(Normal Operation)

All Devices Present
(Normal Operation)

INTERRUPT SYSTEM

This is a continuation of application Ser. No. 08/517,936, filed on Aug. 22, 1995, and now abandoned.

BACKGROUND OF THE INVENTION

The present invention relates to interrupt systems.

Current designs utilizing a physical daisy chain interrupt system operate on the principle that during an interrupt acknowledgement cycle each electrical device capable of interrupting must examine the cycle and determine if it should respond. Rather than all the interrupting devices examining the cycle concurrently, a serial or daisy change scheme is employed. In this manner, the first device examines the cycle and either accepts the cycle as it's own or passes the cycle to the next device in line. A physical (electrical) connection is used to accomplish this task. A problem with this system develops when a device is removed from the daisy chain thereby preventing all downstream devices from acknowledging an interrupt.

SUMMARY OF THE INVENTION

A principal feature of the present invention is the provision of an interrupt system.

The interrupt system comprises, a plurality of electrical devices having a time frame in which to examine an interrupt acknowledgement cycle, first and second lines electrically connected to each of the electrical devices, and means for issuing an interrupt signal on the first line.

A feature of the invention is that the devices determine during its time frame whether the cycle is intended for itself.

Another feature of the invention is that a selected electrical device asserts a common acknowledgement signal on the second line indicating the cycle is being serviced.

Yet another feature of the invention is that removal of any electrical device does not compromise the system interrupt capability.

Further features will become more fully apparent from the following description of the invention, and from the appending claims.

DESCRIPTION OF THE PREFERRED EMBODIMENTS

Current system designs utilize a physical daisy chain interrupt system operate on the principle that during an interrupt acknowledgement cycle each electrical device capable of interrupting must examine the cycle and determine if it should respond. Rather than all the interrupting devices examining the cycle concurrently, a serial or daisy change scheme is employed. In this manner, the first device examines the cycle and either accepts the cycle as it's own or passes the cycle to the next device in line. A physical (electrical) connection is used to accomplish this task. A problem with this system develops when a device is removed from the daisy chain thereby preventing all downstream devices from acknowledging an interrupt.

Figure 1:
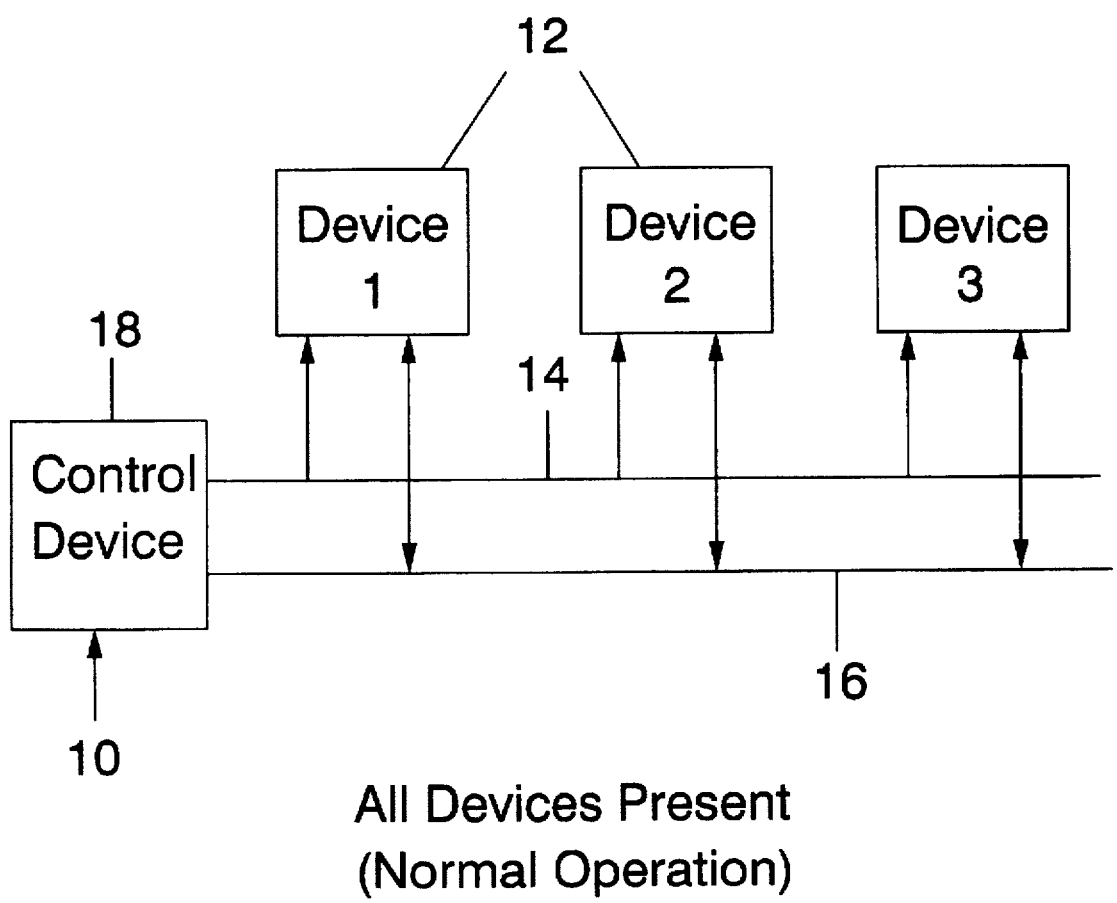
FIG. 1 is a block diagram of an interrupt system of the present invention.

In accordance with the present invention, a time multiplex system has been developed to overcome difficulties with the physical daisy chain. With reference to FIG. 1, the interrupt system 10 has a plurality of electrical devices 12 assigned a time frame in which to examine an interrupt acknowledgement cycle.

The system 10 has a first interrupt line 14 electrically connected to all the electrical devices 12. The system 10 also has a second acknowledgement line 16 electrically connected to all the electrical devices 12. The system 10 also has a control device 18 connected to the first and second lines 14 and 16.

The control device 18 issues an interrupt signal on the first line 14. The electrical devices 12 determine during it's time frame whether the cycle is intended for itself, in which case it asserts a common acknowledgement signal on line 16 to all the electrical devices 12 indicating that the cycle is being serviced.

Figure 2:
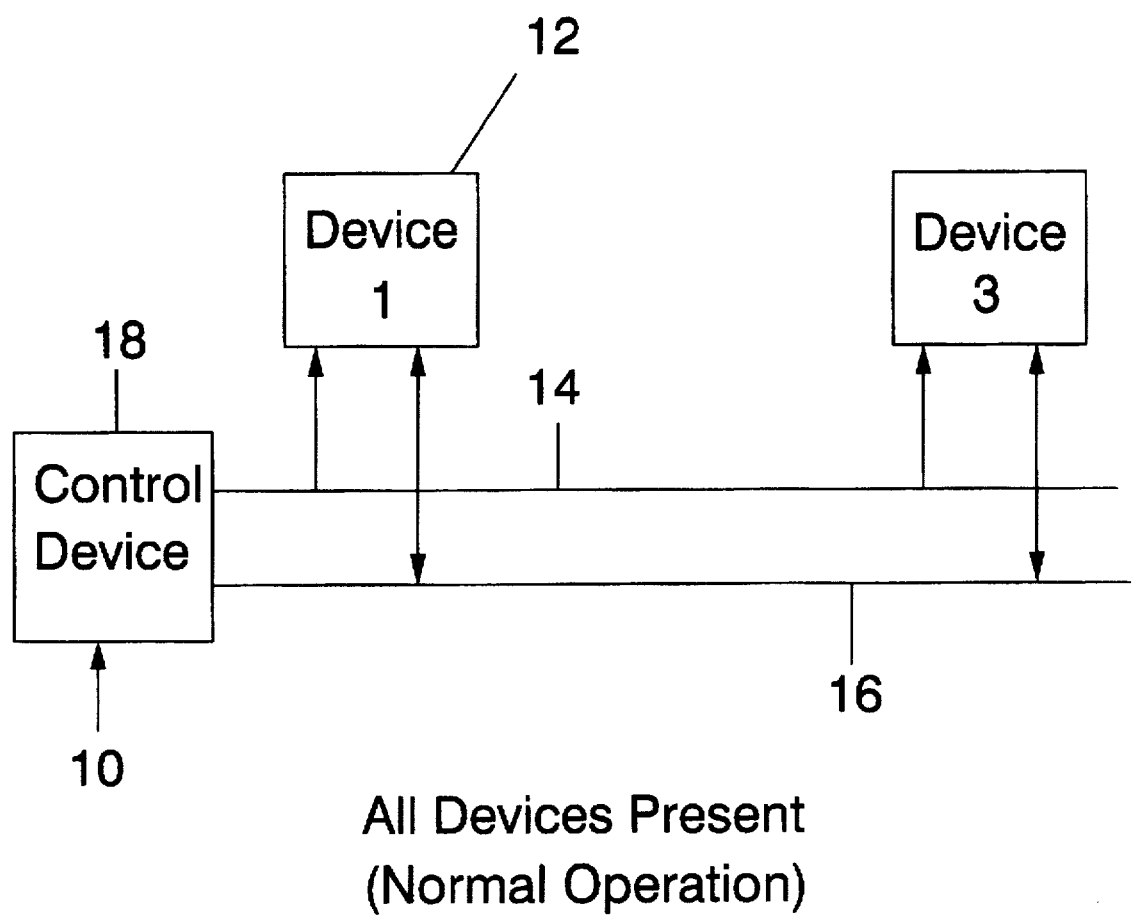
FIG. 2 is a block diagram of the system of FIG. 1 showing an electrical device being removed from the system.

As shown in FIG. 2, the removal of any electrical device 12 does not compromise the systems interrupt capability as solved by the time multiplex system.

The foregoing detailed description has been given for clearness of understanding only, and no unnecessary limitations should be understood therefrom, as modifications will be obvious to those skilled in the art.

What is claimed is:

1. An interrupt system, comprising:
   a plurality of electrical devices, each electrically operatively coupled to a first line and a second line in a parallel arrangement;
   means for issuing an interrupt signal on the first line such that each electrical device receives the interrupt signal;
   each electrical device configured to determine whether the interrupt signal received on the first line is intended for itself and respond thereto during an interrupt acknowledgment cycle, by asserting a common interrupt acknowledgement signal on the second line, if the interrupt signal was intended for itself;
   a plurality of discrete time frames each having a predetermined length and located at a predetermined position within the interrupt acknowledgment cycle, each time frame corresponding to one electrical device of the plurality of electrical devices;
   each electrical device asserting the common interrupt acknowledgment signal on the second line only during its time frame if the interrupt signal was intended for itself, said assertion of the common interrupt acknowledgment signal indicating that the interrupt acknowledgment cycle is being serviced such that removal of any one of the electrical devices does not prevent remaining electrical devices from receiving the interrupt signal and asserting the common interrupt acknowledgment signal if the interrupt signal was intended for itself.

2. The interrupt system according to claim 1 wherein each time frame corresponding to each electrical device is arranged in a non-overlapping sequential manner within the interrupt acknowledgment cycle.

3. The interrupt system according to claim 1 wherein each of the electrical devices is configured to respond to the interrupt signal during its time frame and is prevented from responding during a time frame assigned to a another electrical device.

4. The interrupt system according to claim 1 wherein each of the electrical devices receives the interrupt signal at the same time, and if the interrupt signal was intended for itself, the electrical device asserts the common interrupt acknowledgment signal at a different time from the time that any other electrical device asserts the common interrupt acknowledgment signal in its time frame within the interrupt acknowledgment cycle.

* * * * *